United States Patent [19]

Stefanic

[11] Patent Number: 4,624,167

[45] Date of Patent: Nov. 25, 1986

[54] BLADE SPEED CONTROL FOR A BAND SAW

[75] Inventor: Joseph M. Stefanic, Oak Park, Ill.

[73] Assignee: Armstrong-Blum Mfg. Co., Chicago, Ill.

[21] Appl. No.: 415,292

[22] Filed: Sep. 7, 1982

[51] Int. Cl.⁴ .................. F16H 55/52; B26D 1/46
[52] U.S. Cl. ......................... 83/802; 83/788; 474/40
[58] Field of Search ................... 83/788-820, 83/494, 311, 403.1; 474/39-42

[56] References Cited

U.S. PATENT DOCUMENTS

| | | | |
|---|---|---|---|
| 2,215,742 | 9/1940 | Reeves | 474/39 |
| 2,707,883 | 5/1955 | Dodge | 474/39 |
| 2,830,628 | 4/1958 | Pettigrew | 83/788 |
| 3,117,461 | 1/1964 | Fermier | 474/39 |
| 3,811,331 | 5/1974 | Moogk | 474/39 |
| 3,908,501 | 9/1975 | Aizawa | 83/788 |
| 4,088,036 | 5/1978 | Hillman | 474/39 |

*Primary Examiner*—James M. Meister
*Assistant Examiner*—John L. Knoble
*Attorney, Agent, or Firm*—James G. Staples

[57] ABSTRACT

A mechanical, infinitely variable blade speed drive for a band saw is provided with a speed control which includes a variable pitch drive pulley with axially adjustable sheave spacing to vary the drive ratio between the drive pulley and the driven pulley and a control shaft parallel to the drive shaft of the motor which carries the drive pulley. The control shaft extends to the front portion of the band saw so that the speed adjustment control carried thereon is readily accessible to the band saw operator without moving away from the front portion of the band saw during its operation.

3 Claims, 5 Drawing Figures

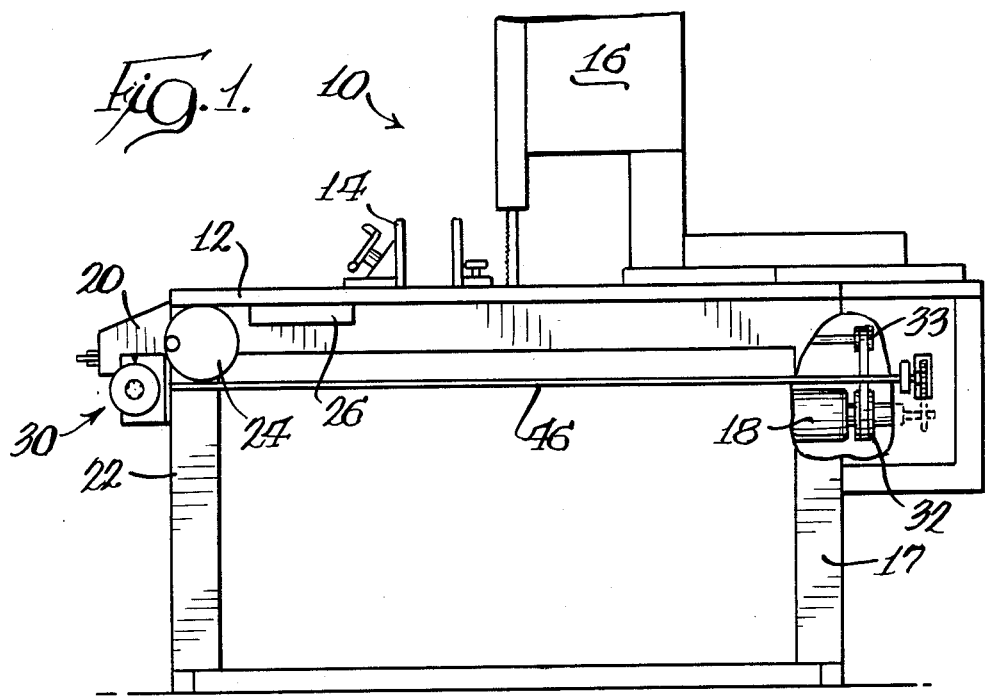
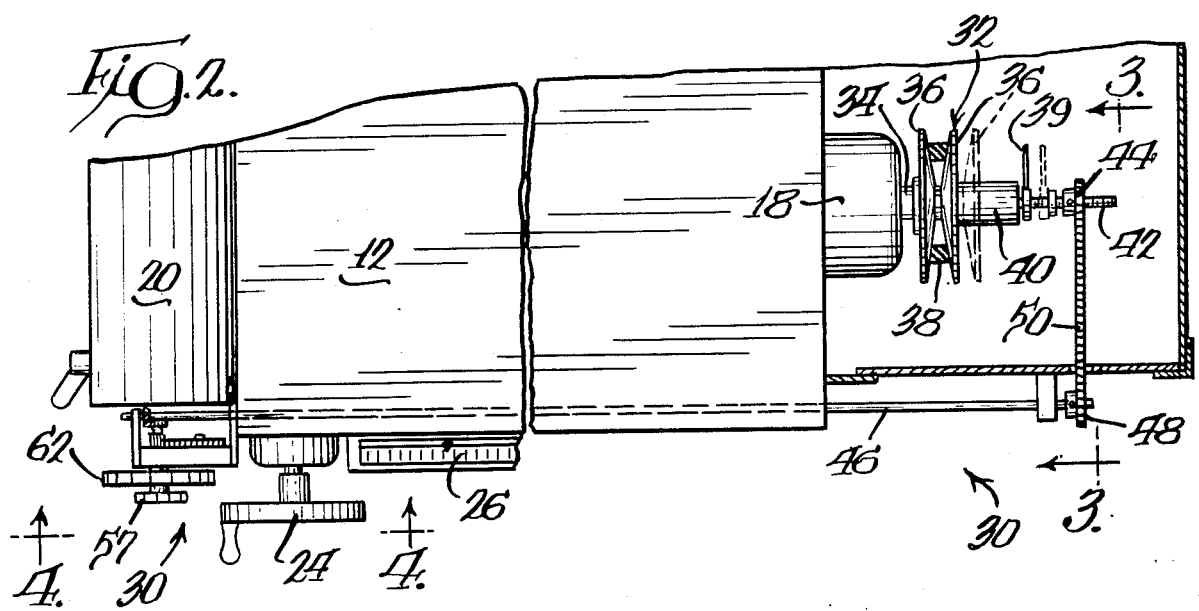
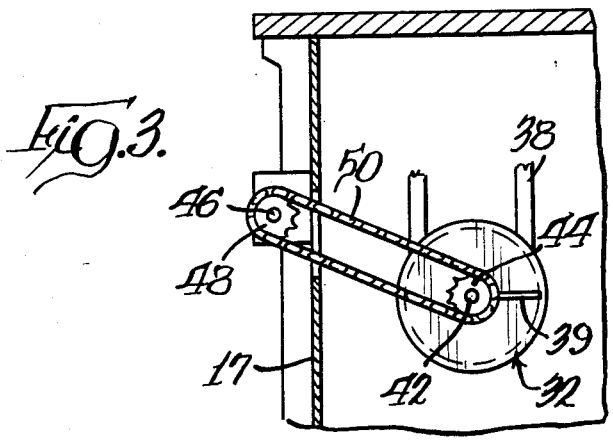

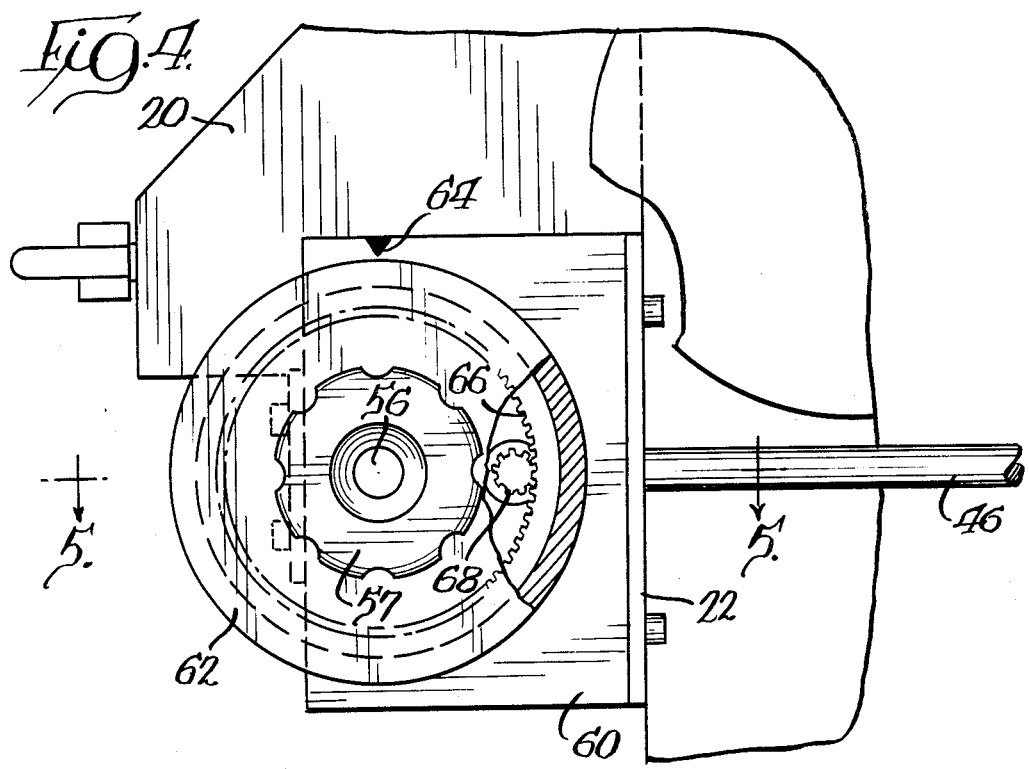
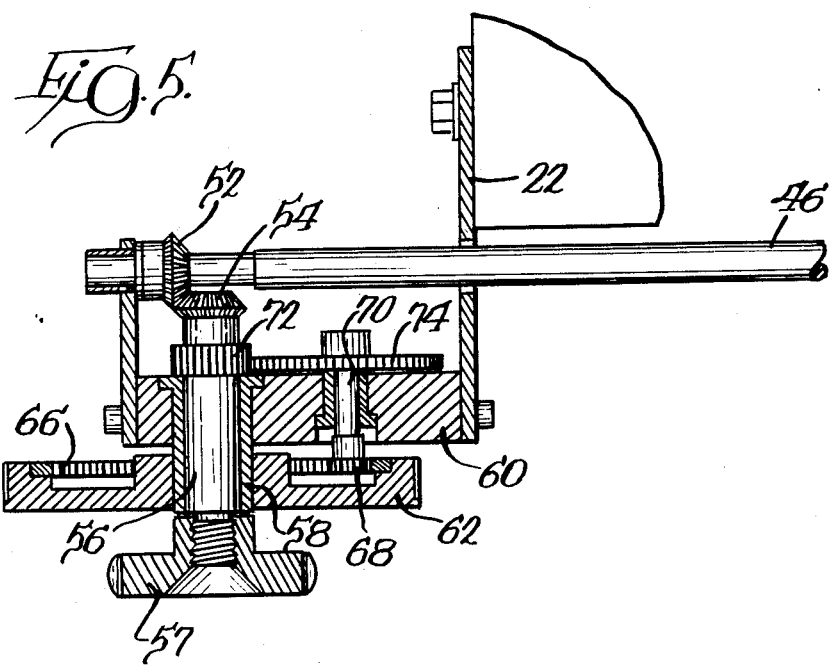

BLADE SPEED CONTROL FOR A BAND SAW

TECHNICAL FIELD

This invention relates generally to a system for controlling the blade speed of a band saw and, more particularly, to a speed control system which is infinitely variable as well as adjustable by the operator without leaving the usual work station while the band saw is in operation.

BACKGROUND OF THE INVENTION

In the art of metal cutting with band saws, the productivity or efficiency of a machine such as the band saw is the result of a number of variable and controllable factors. Included among such variables are the pressure at which the band saw blade bears against the workpiece, the quality of lubrication of the blade, and the speed at which the blade traverses the workpiece during the sawing cycle.

With regard to blade speed, it is well known that optimum efficiency can be achieved only if the blade speed is set to fit the actual conditions of workpiece characteristics and feed rate. In general, the optimum blade speed is proportional to what is commonly called the "machinability" of the metal workpiece and includes such factors as alloying element content, crystalline structure, and hardness. Thus, for example, readily machinable steels such as structural steel or pipe require moderate blade speeds on the order of about 250 feet per minute, whereas harder steels or cast iron require relatively slow blade speeds on the order of about 50 to 150 feet per minute. Similarly, non-ferrous metals such as brass or copper may be sawed at relatively high blade speeds on the order of about 450 feet per minute.

Skilled workers in the art and operators of band saws also are aware that optimum blade speed and feed pressure are frequently achievable only through the hands-on observational and touch skills of the experienced operator. By way of example, the sound of the cutting action and the appearance of the chips being formed are significant to the skilled operator. The formation of powdery chips could indicate a feed which is too light while short burned chips might result from a feed which is excessive. Similarly, a chattering or vibration of the blade could be the result of excessive blade speed. Thus, whatever blade speeds and feeds may be recommended in published charts and manuals for all of the different types of metals, such recommendations serve at best only as starting rates of feeds and speeds which must be finely tuned to actual conditions for optimization. Optimum sawing conditions thus can be achieved only by the hands-on skill of the operator while the sawing machine is in operation.

Basically, there are two ways of adjusting the speed of a motor-driven band saw blade. One is by use of a variable speed motor, but this is objectionable because of relatively high cost and fluctuating torque. The second is by way of a mechanical variable speed drive employing a belt and sheaves, at least one of which is axially adjustable to vary the drive ratio therebetween and the output speed. The mechanical variable speed drive is more desirable for reasons of lower cost, light weight, easy maintenance and relatively constant output torque. The present invention is directed to such a system.

Band saws incorporating blade speed control systems of the type with which this invention is concerned have heretofore been provided. In this regard, the most material prior art publication is believed to be the publication entitled "Marvel Series 8 MARK I Universal Band Saw" Catalog 803/281 which is published by Armstrong-Blum Manufacturing Co., 5800 West Bloomingdale Avenue, Chicago, Ill. 60639.

As illustrated and described in said publication, the band saw includes a table, a vise for holding the workpiece, a movable blade-carrying column and motor means together with an associated belt system for driving the blade and feeding the same against the workpiece. At the front portion of the band saw, where the operator work station is situated, there is provided a control panel and also the means for adjusting the blade feed pressure. The means for adjusting the blade speed, on the other hand, is mounted on the back of the machine and comprises a direct connection to a variable pitch drive pulley that drives the band wheels.

Continued use and experience with the said prior art band saw has revealed certain disadvantages that pertain to the blade speed control system. For purposes of accuracy, all blade speeds, including the suggested starting speeds recommended in tables and manuals, should be set with the blade drive motor running. With the prior art saw this means that the operator must position the workpiece in the vise, position the band saw blade close to, but not touching, the workpiece, set the suggested feed and turn on the motor while standing at or near the front control panel. The operator is then required to leave the front control panel, go to the back of the machine to set the blade speed indicator at the suggest starting rate, and thereafter return to the front control panel to begin the actual sawing cycle. If further fine adjustment of the blade speed is required, as is normally the case, the operator again has to walk to the back of the band saw to make that adjustment. Not only is the described movement of the operator wasteful of time and energy, but it also takes him away from the usual work station in front of the band saw from where he could best observe and "feel" the efficiency of the cutting operation.

In addition to the foregoing, the prior art band saw had to be placed sufficiently spaced from a room wall to permit access to the back portion of the band saw where the blade speed control is located, an obvious waste of floor space.

SUMMARY OF THE INVENTION

The present invention overcomes the aforementioned problems by providing a blade speed control system at the normal operator's station for the band saw. The blade speed adjustment means is not connected directly to the variable pitch drive pulley. Instead, the control means is linked indirectly to a variable pitch drive pulley that drives the band wheels of the band saw via a belt system through an actuating shaft situated parallel to the drive sahft of the band saw blade drive mo The speed adjustment knob and indicator dial are thus positioned on the front portion of the band saw adjacent the control panel so that blade speed is readily adjustable by the operator while stationed there. Since access to the back of the band saw is no longer required for normal operation, the band saw may be positioned directly against a wall if desired.

As a result of this achievement, productivity and efficiency are increased in terms of one or more of the following: longer blade life, faster cuts, more accurate cuts, more efficient cuts, more efficient power usage, as well as reduced operator fatigue.

BRIEF DESCRIPTION OF THE DRAWING

The invention is illustrated in the accompanying Figures wherein:

FIG. 1 is a diagramatic side elevational view of a metal cutting band saw incorporating the principles of the invention;

FIG. 2 is a fragmentary top plan view of linkage and connection of the blade speed control system to the variable pitch drive pulley;

FIG. 3 is a sectional view taken on the plane of line 3—3 in FIG. 2.

FIG. 4 is an enlarged elevational view, partially in section, taken on the plane of line 4—4 in FIG. 2; and FIG. 5 is a horizontal sectional view taken on the plane of line 5—5 in FIG. 4.

DESCRIPTION OF A SPECIFIC EMBODIMENT

Referring to FIG. 1 of the drawings, a band saw 10 comprises a table 12, a workpiece holding vise 14, a movable blade-supporting column 16, motor 18 for driving the blade, and a control panel 20 on a front portion 22 of the band saw, all carried by frame 17. The motor 18 is fixedly mounted on the frame. Band saw 10 and suitable drive shaft, such as an elongated drive spline mounted in an appropriate sleeve (not shown) is provided to permit movement of the bladesupporting column 16 while the endless band saw blade is driven via conventional band wheels by motor 18 using a drive belt system. Also positioned adjacent the front of the band saw 10 are a hand wheel 24 for manually positioning the blade adjacent the workpiece and pressure feed control means 26. Since the basic structure of the band saw 10 does not form an integral part of the invention, it is shown diagramatically and will not be further illustrated or described. It should be noted, however, that all of the control means for band saw operation are located at the front portion of the band saw where they are conveniently and readily accessible to the operator.

Referring to FIGS. 2-5 of the drawings, a blade speed control system embodying the principles of the invention is indicated generally by the numeral 30. The speed control system 30 comprises a variable pitch drive pulley 32 mounted on the drive shaft 34 of the motor 18. Drive pulley 32 comprises a pair of opposed conical sheaves 36 which can be opened or closed axially to vary the distance therebetween which movement in turn, adjusts the effective pitch at which belt 38 contacts the sheaves. Thus, the drive ratio between the drive pulley 32 and the driven pulley 33 which likewise carries the belt 38 is adjusted. The axial displacement of a sheave 36 is shown in phantom in FIG. 2. Also mounted on the drive shaft 34 is a coupling housing 40 containing conventional means (not shown) for effecting the actual axial movement of the sheaves 36 in a manner well known to those skilled in the art.

Torque rod 39 is fixed to housing 40 and abuts a plate mounted on frame 17. An extended drive pulley adjustment shaft 42 is coupled to the housing 40 and carries a pulley sprocket wheel 44 adjacent the distal end thereof. Shaft 42 is substantially in axial alignment with drive shaft 34. A control shaft 46 is rotatably mounted on frame 17 and extends along frame 17 in parallel relationship with the drive shaft 34 and pulley shaft 42. Mounted on the control shaft 46 adjacent the distal end thereof and in horizontal alignment with the pulley sprocket wheel 44 is a control shaft sprocket wheel 48. An endless sprocket chain 50 is carried by the sprocket wheels 44 and 48 whereby the control shaft 46 and pulley shaft 42 are mechanically coupled for synchronous rotation. The proximal end of shaft 46 terminates near the front portion 22 of the band saw.

Turning now in particular to FIGS. 4 and 5 of the drawings, the hand controls and speed indicator for the system 30 will be described. A miter gear 52 is rigidly mounted on the control shaft 46 adjacent the proximal end thereof and is meshed with a similar miter gear 54 carried by a stub shaft 56. The stub shaft 56 carries an adjustment knob 57 on its free end and is rotatable in a bushing 58 mounted in a housing 60 connected to the front portion 22 of the band saw 10. The miter gears 52 and 54 and the sprocket wheels 44 and 48 each have equal numbers of teeth so that there is a unity coupling between the pulley shaft 42 and control shaft 46. In this manner both shafts will always rotate synchronously through the same number of turns.

An indicator dial 62 is rotatably mounted on the bushing 58 and is provided with blade speed indicia marked thereon. The blade speed indicia cooperate with an indicator mark 64 on the housing 60 to give blade speed readings. The indicator dial 62 is formed with an annular internal gear 66 which meshes with a spur gear 68 mounted on a shaft 70 and rotatable in the housing 60. Inside the housing 60, the stub shaft 56 and shaft 70 carry intermediate gears 72 and 74 respectively which gears are likewise meshed. It will thus be seen that rotation of the adjustment knob 57 actuates the described gear train to cause rotation of the indicator dial 62 to give the operator a direct reading, calibrated in feet or meters per minute as desired, for the speed of the band saw blade. In the embodiment described, the gear reduction ratio is 20:1 so that each complete revolution of the control knob 57 causes the indicator dial 62 to turn 1/20th revolution. The dial carries blade speed markings ranging from 50 to 450 feet per minute.

From the foregoing description it will be appreciated that the invention provides a novel system for accurate adjustment of the speed of the band saw blade. The coupling of the parallel control rod and pulley shaft extension enable the speed control knob and indicator dial to be located at the front of the machine where the operator is stationed and can employ his skills to achieve optimum cutting efficiency at all times.

Although a preferred form of the invention has been illustrated and described, it will be understood that the invention may take forms not specifically illustrated in the drawing. For example, while a metal cutting band saw has been illustrated, the present invention can be beneficially utilized in band saws for cutting other materials as well. Accordingly, it is intended that the scope of the invention be limited not by the foregoing specific embodiment, but solely by the scope of the hereinafter appended claims when interpreted in light of the prior art.

What is claimed is:

1. In a band saw having a frame, a front portion, an endless saw blade mounted on band wheels carried on said frame, a motor for driving said saw blade operably associated with said band saw, and a mechanically infinitely variable speed drive for said saw blade which includes a drive pulley having a pair of axially movable sheaves and mounted on the drive shaft of said motor, an adjustable speed control system for said saw blade comprising:

a control shaft rotatably mounted on said frame in spaced parallel relationship with said motor drive shaft;

coupling means operably connecting said control shaft to said ddrive pulley whereby rotation of said control shaft changes the axial spacing between said sheaves;

adjustment means on said control shaft at said front portion for manually rotating said control shaft;

said adjustment means comprising a first miter gear rigidly mounted on said control shaft, a second miter gear meshed with said first miter gear and carried on a stub shaft mounted from said band saw front portion, and a hand grippable member on said stub shaft for rotating said stub shaft and miter gears; and a blade speed indicator dial rotatable on said stub shaft and a gear train operably connected between said stub and indicator dial.

2. The speed control system of claim 1 in which said gear train provides a reduction ratio of 20:1 so that each revolution of said stub shaft causes 1/20th revolution of said indicator dial.

3. A manually operable system for adjusting the infinitely variable blade speed of a band saw driven by a motor having a drive shaft and comprising:

a variable pitch drive pulley mounted on the drive shaft of the motor, said drive pulley comprising a pair of axially movable conical sheaves;

shaft adjustment means for axially moving said sheaves to vary the distance there between in substantial axial alignment with said drive shaft;

a driven pulley connected to said drive pulley by an endless belt;

a control shaft rotatably mounted on said band saw in parallel spaced relationship with said motor drive shaft;

sprocket wheels rigidly mounted respectively on said control shaft and said adjustment shaft means and being operably connected by a sprocket chain;

adjustment means on said control shaft for rotating said control shaft, said adjustment means being mounted on said control shaft adjacent to the front portion of said band saw;

said adjustment means comprises first miter gear rigidly mounted on said first miter gear and carried on a stub shaft rotably mounted from said front portion, and an adjustment knob on said stub shaft for rotating said stub shaft and miter gears; and a blade speed indicator dial rotatable on said stub shaft and a gear train operably connected between said stub shaft and indicator dial.

* * * * *